June 7, 1932. H. NEVILLE ET AL 1,862,236
SLIDING WINDOW
Filed Aug. 18, 1931 2 Sheets-Sheet 1
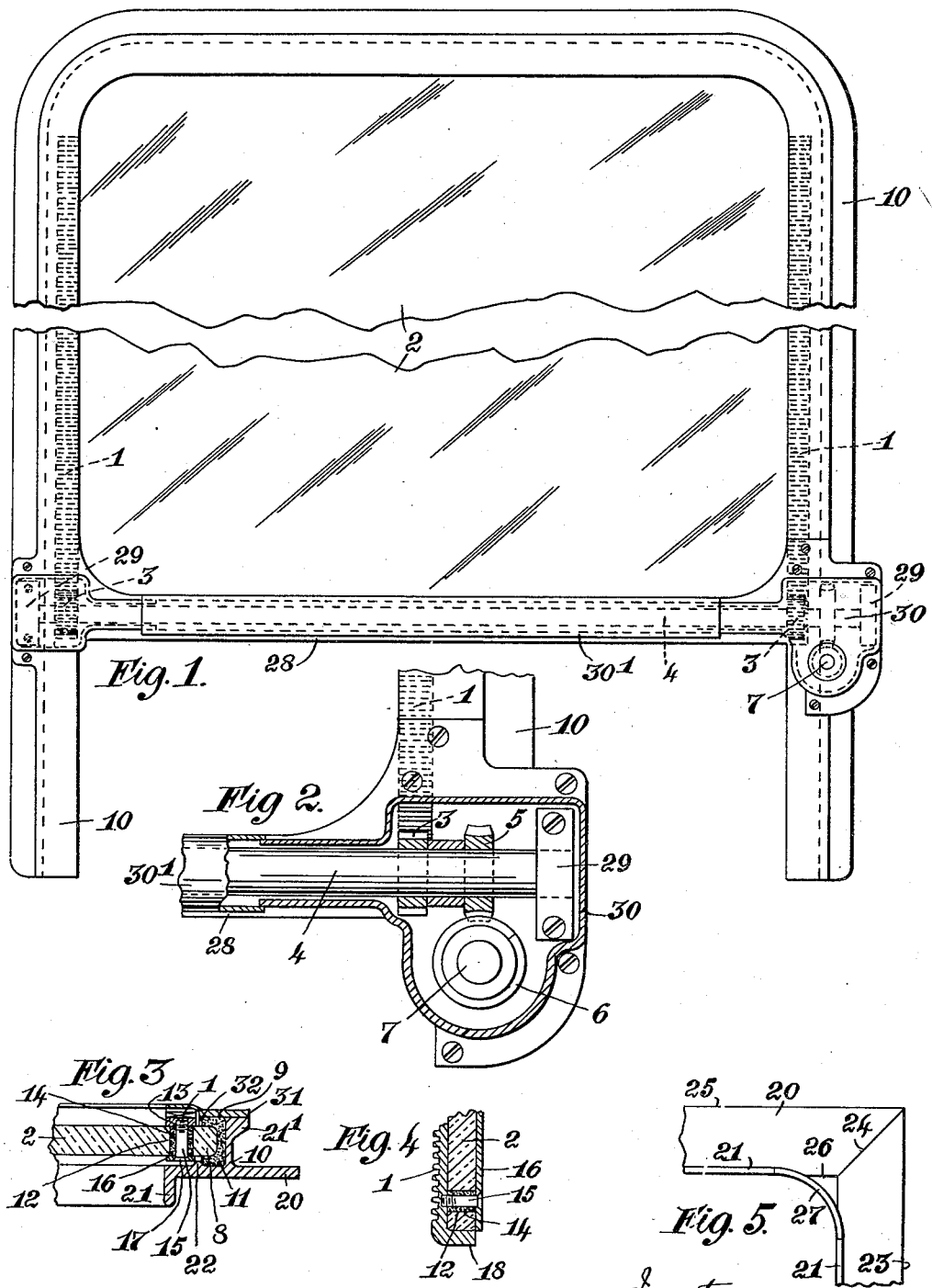

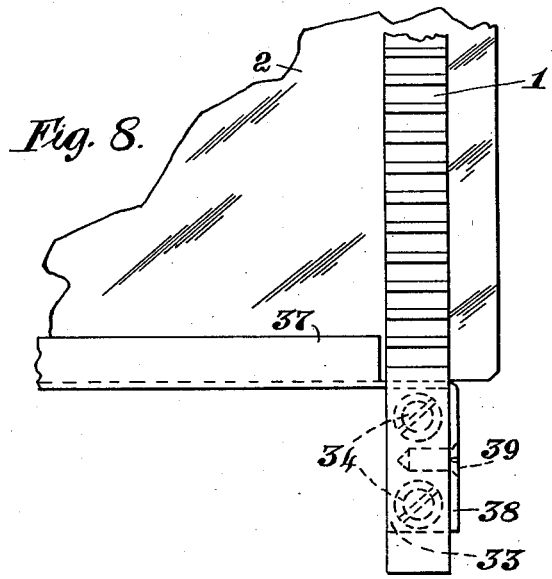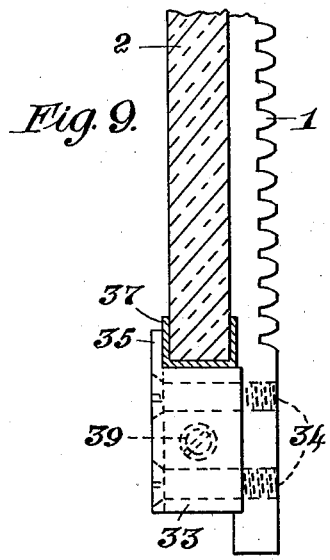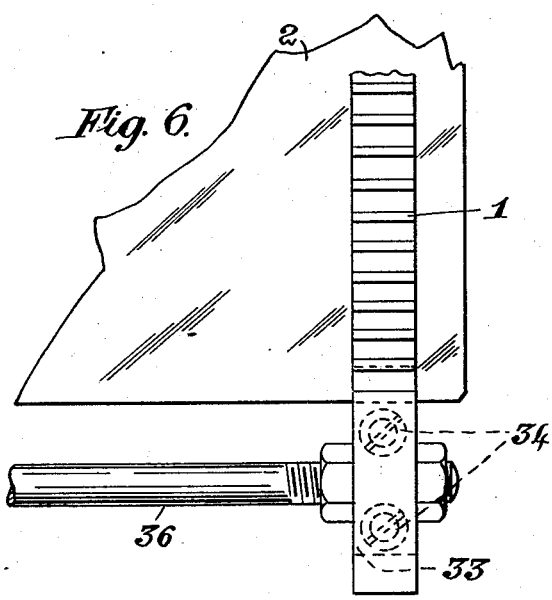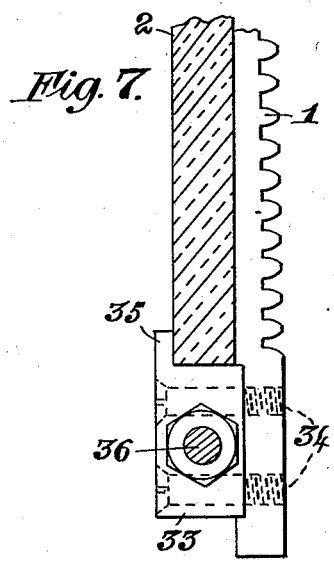

Patented June 7, 1932

1,862,236

UNITED STATES PATENT OFFICE

HERBERT NEVILLE, OF CHEAM, AND ERNEST WILLIAM COTTER, OF LONDON, ENGLAND, ASSIGNORS TO J. STONE & COMPANY LIMITED, OF DEPTFORD, ENGLAND, A CORPORATION OF GREAT BRITAIN

SLIDING WINDOW

Application filed August 18, 1931, Serial No. 557,868, and in Great Britain July 8, 1931.

This invention comprises improvements in and connected with sliding windows for ships and other structures and is principally concerned with frameless glass windows such as are advantageously employed as side lights in ships and other structures wherein an uninterrupted view is desired with the sliding window glass in any position. In windows of this type the operation must be simple and fool-proof and as light as possible. Moreover, the fixed frames must be not only light and strong but of good appearance and well adapted for being fitted into and secured in openings in the walls or plates of the structure. Finally, the sliding glasses must not be liable to rattle or fracture, in spite of vibrations or shock and they must be capable of replacement in an easy manner in the event of breakage occurring.

According to these improvements toothed racks are secured to or mounted against each side of the frameless glass, these racks being operated by toothed wheels preferably driven by worm and worm wheel gearing in connection with the operating handle. This feature of securing racks directly to, or mounting the same against, the glass secures the advantage of lightness and the gearing enables the glass to be adjusted positively to any desired degree of window opening and to remain in that condition until readjusted. By this means, counterbalancing springs and devices, such as have been heretofore employed, can be entirely dispensed with.

Various embodiments of the invention by way of example will now be described with reference to the accompanying drawings in which:

Figure 1 is an elevation of one embodiment of the invention.

Figure 2 is a detail view to a larger scale of the operating mechanism thereof,

Figure 3 is a cross section showing the mode of attachment of the racks,

Figure 4 is a vertical section of the lower end of a rack,

Figure 5 is an elevation of a modification,

Figures 6 and 7 are a front and sectional side elevation of another embodiment of the invention, and Figures 8 and 9 are similar views of yet another embodiment.

Referring primarily to Figures 1 to 4 of the drawings, toothed racks 1 are secured to each side of the frameless glass 2 and are operable by toothed wheels 3 fast on a transverse shaft 4 driven through a worm-wheel 5 and a worm 6, the latter being mounted on a shaft 7 with which is connected an operating handle (not shown). To provide for the guidance of the sliding glass 2, the racks 1 are set inwardly a little from the vertical side edges (Figure 3) thereby leaving marginal side edge portions 8 of the glass free for sliding in guide grooves 9 formed in the frame 10. These grooves are lined with felt 11 or equivalent material to prevent rattle and fracture when vibration or shock is experienced.

An advantageous mode of securing the racks to the glass is illustrated in Figures 3 and 4. A suitable number of holes 12 (two are usually sufficient) are formed at suitable points along each vertical margin of the glass. The back of each rack 1 is formed with a similar number of holes 13 of smaller diameter, these holes being screw-threaded. The back of a rack 1 is placed against the inner surface of the glass 2 so that the appropriate holes 12, 13 are opposite one another, an intervening packing strip being usually unnecessary. The holes 12 in the glass receive bushings 14 of vulcanized fibre or other suitable material for the stems of fixing screws 15 to pass through. Against the outer face of the glass 2 and opposite each rack 1, a strip 16 of non-corrosive metal is applied having countersunk holes 17 corresponding with the holes 12, 13 in the glass and racks. The screws 15 inserted through the strip 16 and glass 2, are screwed into the holes 13 in the back of the racks 1, the latter being then securely fixed to the glass. In order to support, or assist in supporting, the weight of the glass 2, each rack 1 is formed with a lateral projection or foot 18 at its lower end, these projections or feet taking under the bottom edge of the glass (Figure 4).

The framing 10 is mainly an arch-shaped member advantageously produced from extruded or drawn metal of appropriate section. It is undesirable, when forming window apertures in ships' plating, to have sharp angles and therefore the top corners 19 of the frame must be curved or radiused to fit the curves made at these places when forming the apertures in the plating. To effect economy and simplification in the manufacture of these frames, they may be built up from lengths of extruded or drawn section metal. Each length is extruded or drawn so as to comprise a main face plate part 20 (Figure 3), an outwardly projecting spigot part 21 along its inner edge, and a strengthened web or half-rail section part 21' projecting perpendicularly along about the middle of its inner face. Along the inner face, moreover, and parallel with the web 21', there is formed a small lip or rib 22, for retention of the felt 11 or like guide as hereinafter explained.

In the modified arrangement shown in Figure 5 two long lengths 23 of this metal, to form the vertical side members of a frame 10, have their upper ends mitred at 24, and a shorter length 25, to form the top member has its ends mitred to fit the said top ends, the mitred ends being then brazed or welded. From the inner angles of the arch frame thus formed, the spigot parts 21 are removed for a few inches from the mitre joint along each frame member 23, 25. Angular plate pieces 26 formed with curved or quadrantal spigot parts 27 are then fitted into the angles and brazed or welded therein, so that the said curved spigot parts 27 join the straight spigot parts 21 of the top and vertical side members 23, 25 of the frame. The bottom bar 28 of the frame is suitably attached to the vertical members and fitted with bearings 29 for the hollow cross shaft 4 carrying the pinions 3 for meshing with the racks 1 and the worm wheel 5 for meshing with the worm 6. At one end of the bottom bar 28 is fitted a box or housing 30 enclosing the gears at that end and having bearings for the worm spindle 7. The shaft 4 is enclosed by a hollow metal moulding 30' also fitted to the bottom bar 28. The frame 10 is mounted by inserting its spigot 21 into an aperture in the plating and fastening its face plate 20 to such plating.

The channel section strip 11 of felt or like packing or anti-concussive material is inserted into the arch framing 10 so that the back or bottom of the channel lies against the web 21'. The small lip or rib 22 formed on the face plate 20, as aforesaid, engages one of the edges of the channel section strip 11 and thus serves to retain the latter in place. The glass 2 with its racks 1 affixed as aforesaid, has its free marginal edge-portion 8 inserted into the guide channels of the strips 11 and is mounted so that the racks mesh with the pinions 3. Cover plates 31 are then applied and fixed to the heads of the webs 21', these cover plates being formed on their inner surfaces with small lips or ribs 32 which engage and keep in place the other edge of the channel strip 11. These cover plates 31 extend over the racks 1 to guard and obscure the latter, the metal strips 16 on the other side of the glass being disposed just within the face plates 20 so as to be obscured thereby. The cover plates 31 may be made from vitreously enamelled sheet iron, stainless steel, aluminum or other material and may be provided with a coating to conform with surrounding decorative or colour schemes, to be resistant to sea-air or water or to retain a surface which will not require periodical cleaning or renewal.

Instead of securing the racks 1 to the glass 2 by means of the screws 15, the racks may be mounted against the glass in the manner shown in Figures 6 to 9. The weight of the glass is carried simply by a foot portion 18 (Figure 4) of each rack bent under the glass or by means of a block 33 (Figures 6 to 9) secured to each rack 1 by screws 34. Each block 33 is provided with a lip 35 carried a short distance up the face of the glass opposite to the rack 1, said lip preventing any tendency for the rack to come away from the glass. With this arrangement, in which the positive connection by the screws is dispensed with, the racks are free to move laterally to a slight extent within the limits imposed by the channel grooves 9 of the frame 10.

To prevent any possibility of the racks 1 splaying outwards at the bottom when the window is fully open and thus allowing the glass 2 to fall between them, a tie-rod 36 may be secured between the blocks 33 and beneath the glass (Figures 6 and 7). Alternatively a channel section strip 37 of metal can be fitted along the lower edge of the glass, the part of the section forming the base of the channel being extended between the glass 2 and the blocks 33, bent downwardly outside the blocks, as at 38, and secured by a screw 39 (Figures 8 and 9).

In some cases the glass 2 may be sheathed along its top edge by means of sheet metal of channel section, so that when the window is in an open position, ropes and other articles may be passed through the window without damaging the edge of the glass.

If it is desired to provide means for forcing the glass 2 against the outer face of the felt lining 11, this may be done conveniently by providing projections on the sides or top of the racks 1 and also upon the under side of the face of the frame at the top and of the cross piece at the bottom, so that when the glass approaches the fully closed position, a slight wedging action will be obtained, which causes the glass to press forward against the face of the felt lining.

These improvements provide a light, economical and easily manipulated frameless glass window, avoiding the use of springs and counterbalance mechanism, the glass being safeguarded against fracture and capable of being positively adjusted to, and safely left at, any desired degree of opening. Furthermore replacement of the glass is an extremely simple operation.

We claim:

1. Window for ships and other structures, comprising a frameless glass light, toothed racks secured directly to said light at a short distance from the edges thereof, vertical marginal strips of the light being left free, pinions engaging said racks, operating mechanism for rotating said pinions, and a frame provided with guide grooves wherein said marginal strips of the light are guided.

2. Window, comprising the combination of an arched frame-work consisting of a main face-part, an outwardly projecting spigot-part along the inner edge of said face-part and a web-part projecting perpendicularly from about the middle of said face part, a cover plate secured to and extending inwardly of said web to form with the web and said main face-part a guide, a shock-absorbing lining in said guide, a frameless light slidably guided in said lining, racks secured directly to said light, and operating means engaging said racks.

3. Window, comprising a frame forming a guide, a frameless light slidable in said guide, racks disposed adjacent the edges of and along one face of the light at a distance from the edges thereof to leave vertical marginal strips free to slide in said guide, light-supporting blocks attached to the lower ends of said racks, lips on said blocks extending up the other face of said light to hold said light in contact with said racks, and operating mechanism including pinions meshing with said racks.

4. Window, comprising the combination of an arched frame-work consisting of a main face-part, an outwardly projecting spigot-part along the inner edge of said face-part, quadrantal members secured, as by means such as brazing or welding, in the corners of the frame-work, said quadrantal members having curved spigot parts for forming a continuation of the spigot parts of the main frame-work, and a web-part projecting perpendicularly from about the middle of said face-part, with a frameless light slidably guided in said frame-work, racks secured directly to said light, and operating means engaging said racks.

5. Window, comprising a frame forming a guide, a frameless light slidable in said guide, racks disposed along the edges of one face of the light, light supporting blocks attached to the lower ends of said racks, lips on said blocks extending up the other face of said light, a tie device extending between the light supporting blocks, and operating mechanism including pinions meshing with said racks.

HERBERT NEVILLE.
ERNEST WILLIAM COTTER.